(12) United States Patent
Carney et al.

(10) Patent No.: US 11,879,521 B2
(45) Date of Patent: Jan. 23, 2024

(54) WIRE CLIP

(71) Applicants: Kevin Carney, Huntingdon Valley, PA (US); Michael P. Iraci, Philadelphia, PA (US)

(72) Inventors: Kevin Carney, Huntingdon Valley, PA (US); Michael P. Iraci, Philadelphia, PA (US)

(73) Assignees: Kevin Carney, Abington, PA (US); Michael P. Iraci, Philadelphia, PA (US)

( * ) Notice: Subject to any disclaimer, the term of this patent is extended or adjusted under 35 U.S.C. 154(b) by 0 days.

(21) Appl. No.: 17/964,538

(22) Filed: Oct. 12, 2022

(65) Prior Publication Data

US 2023/0141882 A1 May 11, 2023

Related U.S. Application Data

(60) Provisional application No. 63/276,768, filed on Nov. 8, 2021.

(51) Int. Cl.
*F16G 11/14* (2006.01)
(52) U.S. Cl.
CPC ................................. *F16G 11/143* (2013.01)

(58) Field of Classification Search
CPC .. F16G 11/143; F16G 11/106; Y10T 24/3439; Y10T 24/344; Y10T 24/3918; Y10T 24/3916; Y10T 24/3933
USPC ................................. 403/177, 263, 286, 305
See application file for complete search history.

(56) References Cited

U.S. PATENT DOCUMENTS

| | | | | |
|---|---|---|---|---|
| 1,735,691 | A * | 11/1929 | Lawler | B65D 63/14 24/128 |
| 2,151,609 | A * | 3/1939 | Menderman | A01K 91/04 403/209 |
| 4,529,240 | A * | 7/1985 | Engel | A22B 5/161 452/187 |
| 4,930,193 | A * | 6/1990 | Baker | F16G 11/14 24/130 |
| 5,232,193 | A * | 8/1993 | Skakoon | A61M 5/1418 24/130 |
| 5,555,607 | A * | 9/1996 | Parveris | F16L 3/13 24/336 |
| 5,987,710 | A * | 11/1999 | Paul | A01K 69/00 24/130 |

* cited by examiner

*Primary Examiner* — Robert Sandy

(57) ABSTRACT

A wire clip includes a longitudinal hole and a longitudinal through-channel having a generally U-shaped cross section wherein a first end of the longitudinal through-channel is in communication with a lateral opening and a second end of the longitudinal through-channel is closed.

8 Claims, 7 Drawing Sheets

WIRE CLIP

CROSS REFERENCE TO RELATED APPLICATIONS

This application claims the benefit of U.S. Provisional Patent Application 63/276,768, filed Nov. 8, 2021, the entire disclosure of each of which is hereby incorporated herein by reference.

TECHNICAL FIELD

The present disclosure relates generally to an apparatus for securing a twisted wire in a safe and efficient manner.

BACKGROUND

Wire, such as ceiling wire, is often utilized to secure various construction components including, but not limited to, main runners on which rest, for example, ceiling panels. Typically, a first portion of the wire under tension is extended through a hole in the runner with the extruding second portion of wire wrapped partially around the first portion of wire with a remaining part of the second portion of wire left to extend out into space. This extended portion poses a considerable safety hazard as it is sharp, extends outwards and is capable of puncturing or otherwise injuring individuals in proximity to the wire.

What is therefore needed is an apparatus for use in such scenarios whereby the sharp end of the second portion of wire is rendered unlikely to inflict to injury.

SUMMARY

In accordance with exemplary and non-limiting embodiments, a wire clip comprises a longitudinal hole and a longitudinal through-channel having a generally U-shaped cross section wherein a first end of the longitudinal through-channel is in communication with a lateral opening and a second end of the longitudinal through-channel is closed.

DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

Figure 4:
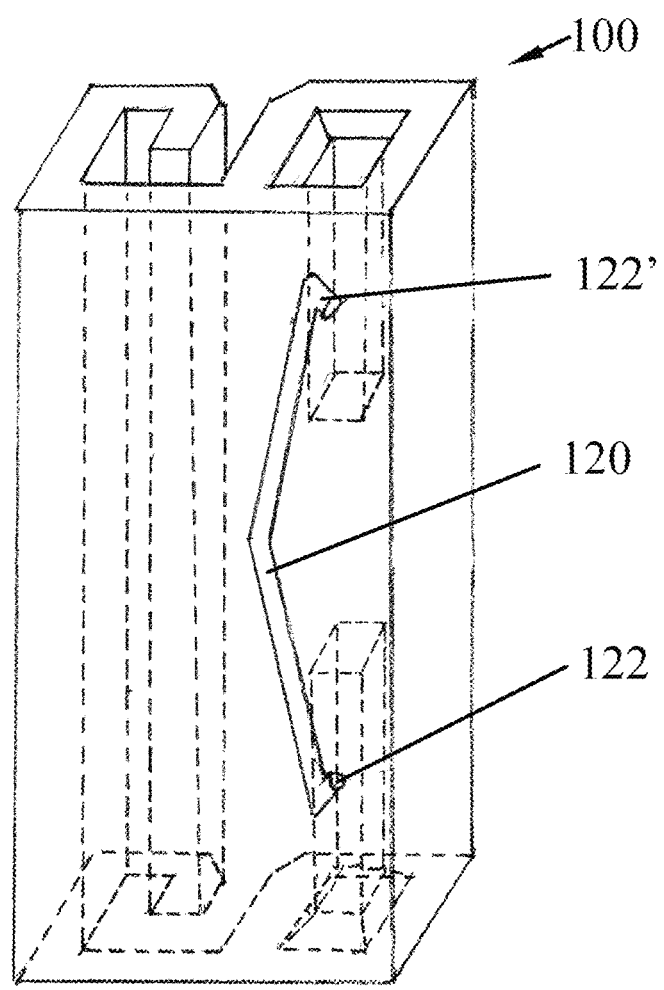

FIG. 4 a perspective illustration of an exemplary and non-limiting embodiment of a wire clip showing an integrated insert.

Figure 5:
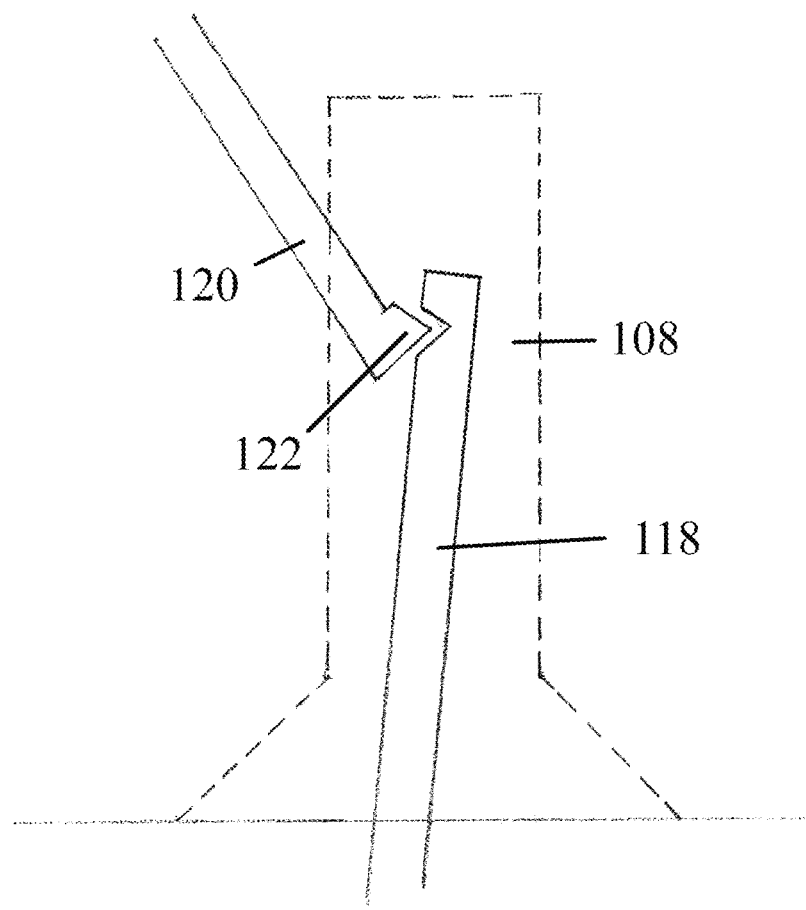

FIG. 5 is a detailed illustration of an exemplary and non-limiting embodiment of a wire clip showing an integrated insert.

Figure 6A:
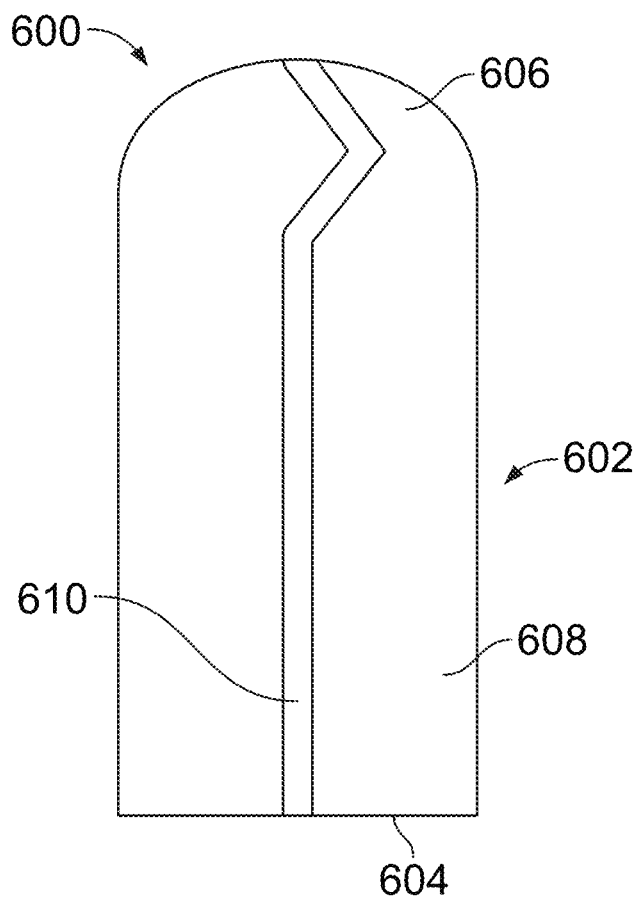
Figure 6B:
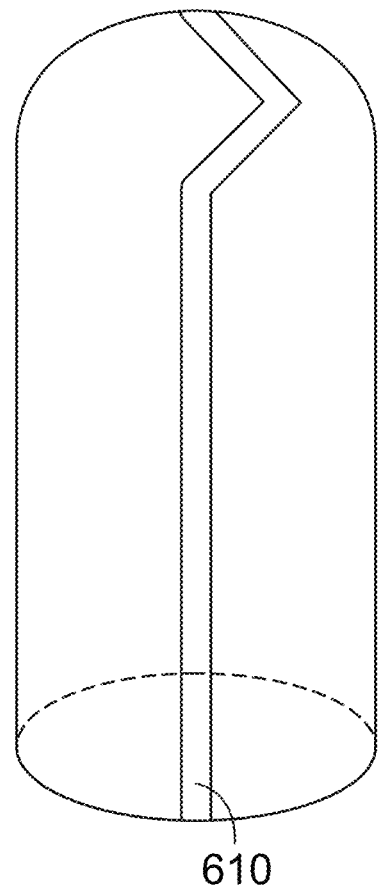
Figure 6C:
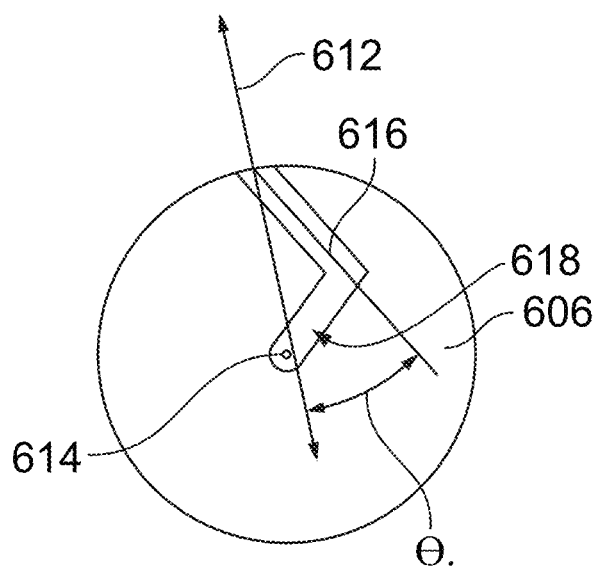

FIGS. 6A-6C are detailed illustrations of an exemplary and non-limiting embodiment of a wire clip.

Figure 7:
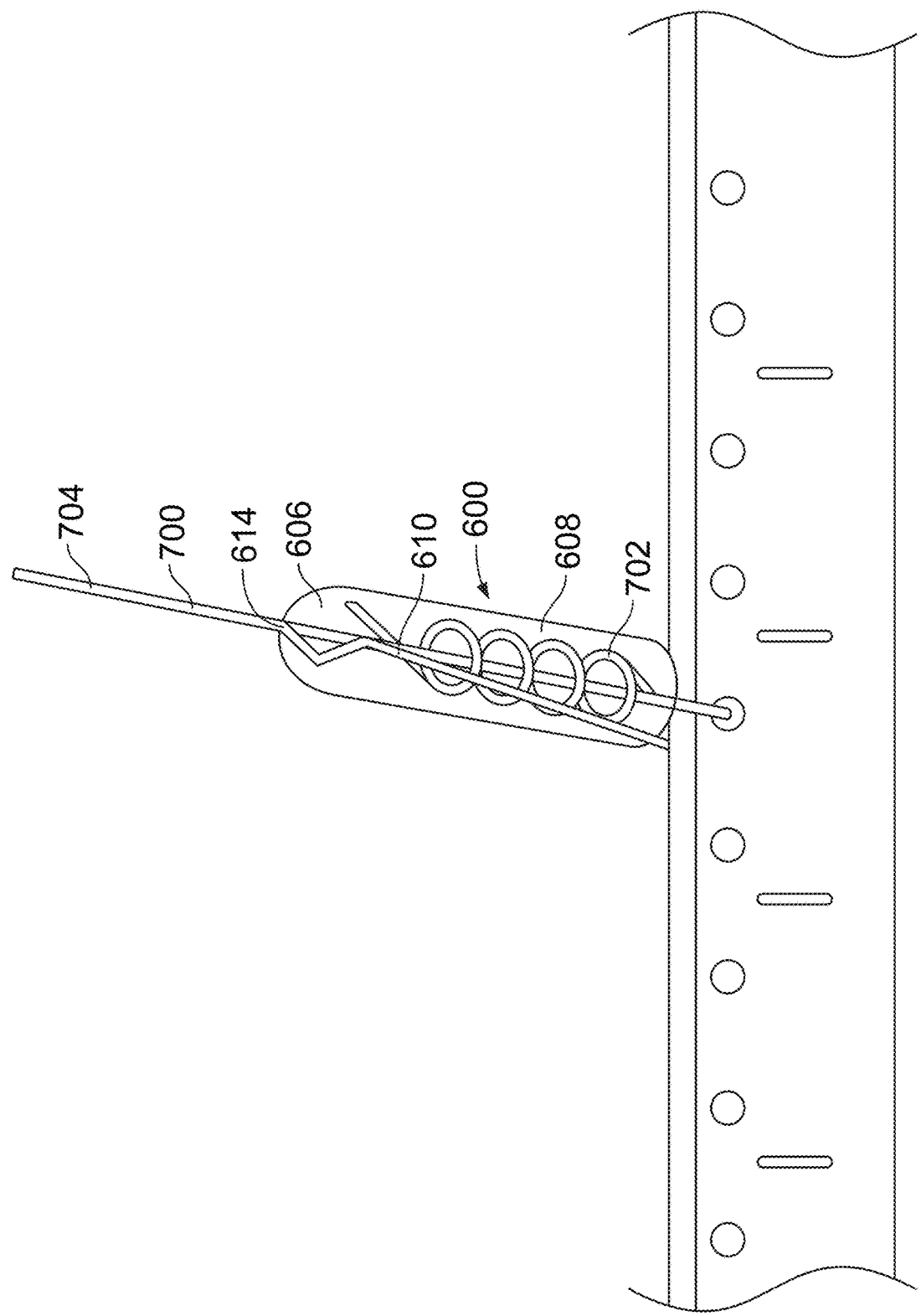

FIG. 7 is a detailed illustration of an exemplary and non-limiting embodiment of a wire clip.

DETAILED DESCRIPTION

As used throughout this application, the word "may" be used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts or components are joined or operate together either directly or indirectly, i.e., through one or more intermediate parts or components, so long as a link occurs. As used herein, "directly coupled" means that two elements are directly in contact with each other.

Figure 1:
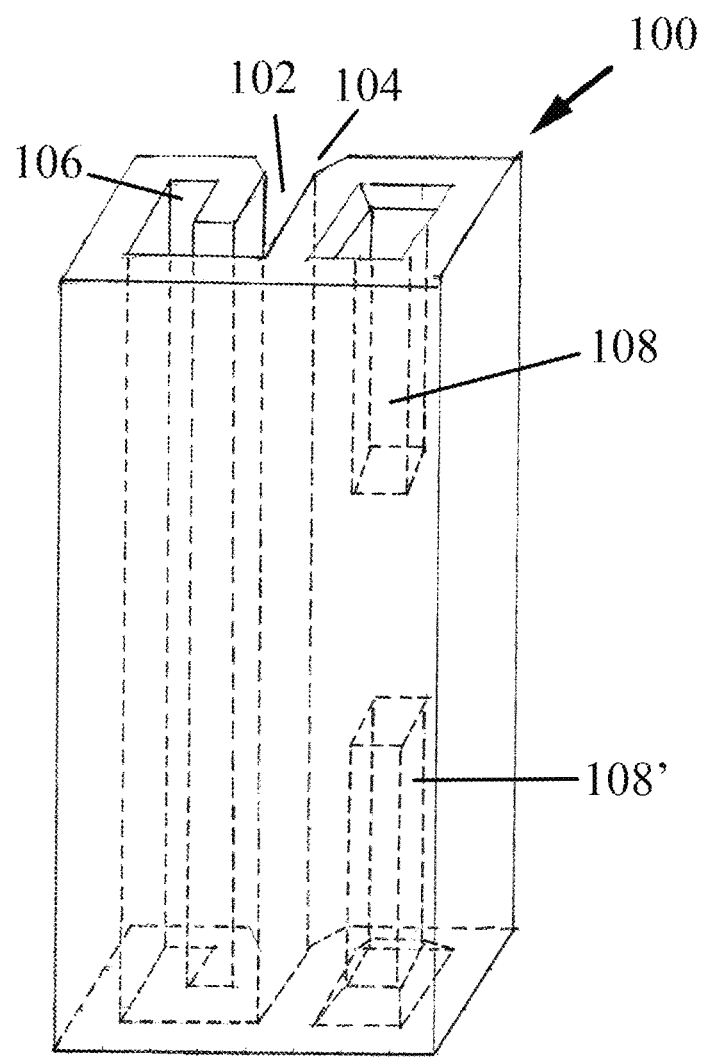
FIG. 1 is a perspective illustration of an exemplary and non-limiting embodiment of a wire clip.

With reference to FIG. 1, there is illustrated an exemplary and non-limiting embodiment of a wire clip 100 having a generally rectangular prism form. Wire clip 100 is formed of a secure channel 102 extending the entire length of wire clip 100. As described more fully below, secure channel 102, viewed on end, extends for a non-linear extent forming a spiral shape. Secure channel 102 comprises a longitudinal through channel having a U-shaped cross section. Note that the lateral opening of secure channel 102 exhibits outwardly divergent walls acting to funnel an external wire to within secure channel 102. As a result, when an expanse of a first portion of wire under tension is inserted into secure channel opening 104 and guided towards a terminus 106 of secure channel 102, the first portion of wire is held snuggly in place so as to resist separation from wire clip 100. Note that in some embodiments, channel opening 104 may be chamfered so as to increase the ease with which a first portion of wire may be guided into wire clip 100.

Opposite secure channel 102 on each end of wire clip 100 and extending a distance into and towards the center of wire clip 100 are wire end receptors 108, 108'. Each wire end receptor 108, 108' may be chamfered in order to more easily guide the insertion of a second portion of wire into one or another of wire end receptors 108, 108'. As illustrated, wire end receptors may terminate within the wire clip 100 thus forming a longitudinal hole that is blind.

Figure 2A:
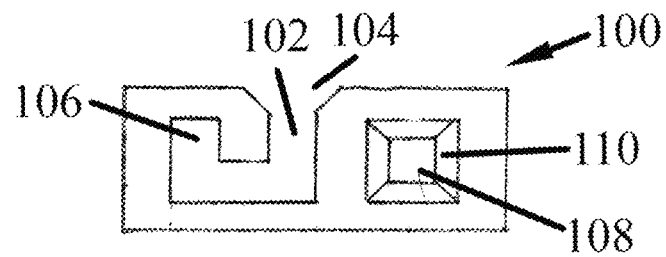
FIG. 2A is an end view of an exemplary and non-limiting embodiment of a wire clip.
Figure 2B:
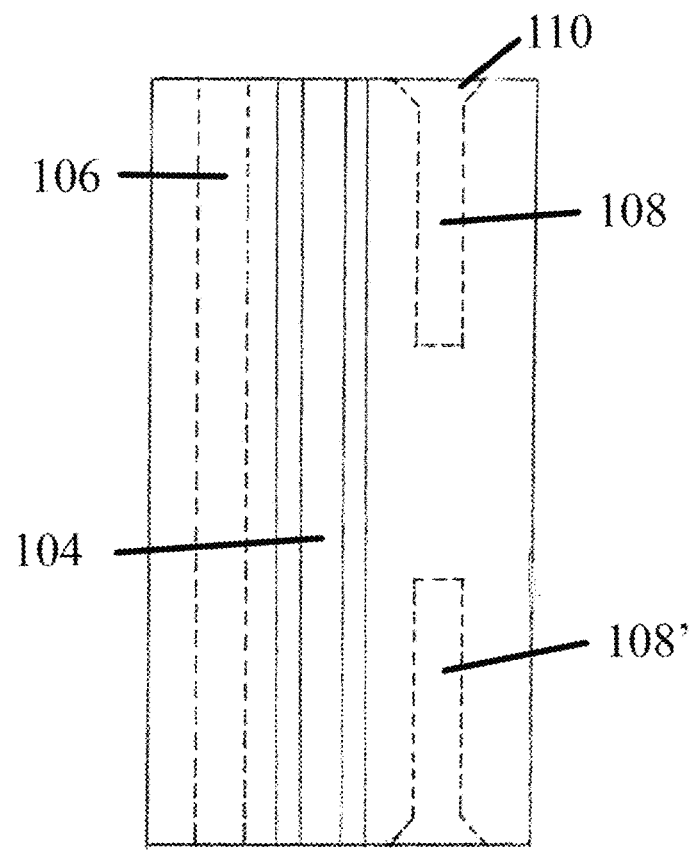
FIG. 2B is a top view of an exemplary and non-limiting embodiment of a wire clip.

With reference to FIGS. 2A and 2B, there is illustrated an exemplary and non-limiting embodiment of wire clip 100. FIG. 2A is an end view of wire clip 100. FIG. 2B is a front view of wire clip 100 as viewed looking into secure channel opening 104. As shown in FIG. 2A, secure channel 102 is shaped such that when a portion of wire is transmitted along the length of secure channel 102 into proximity with terminus 106, the portion of wire is prevented from slipping out of wire clip 100. This attribute is enhanced by the tension that each of the first and second portions of wire exert upon the walls of secure channel 102 and at least one of end receptors 108,108', respectively.

Figure 3:
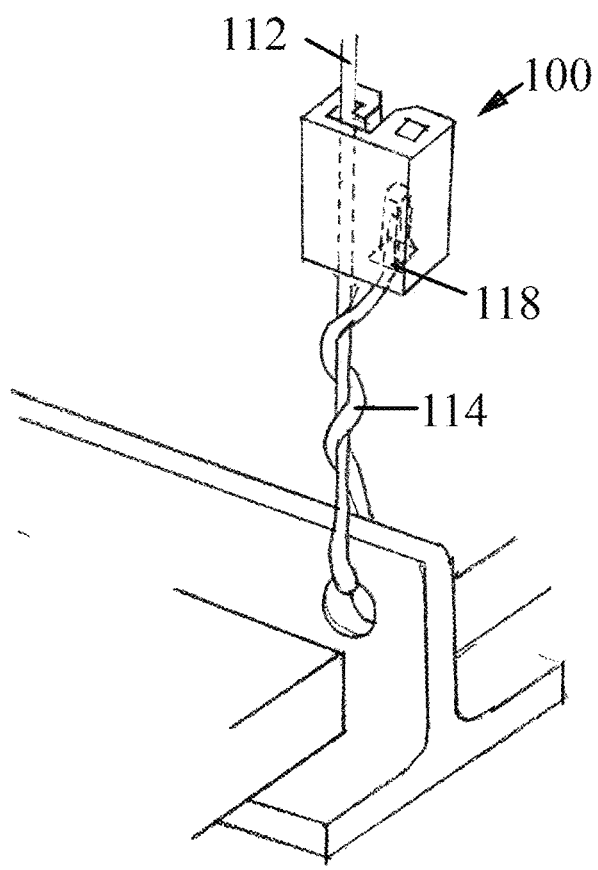
FIG. 3 is an exemplary and non-limiting view of illustration of a wire clip in use.

With reference to FIG. 3, there is illustrated an exemplary and non-limiting embodiment of a perspective rendering of wire clip 100. As illustrated, first wire portion 112 is under tension while second wire portion 114 terminates in an end 118 prone to causing injury. As illustrated, when the end of second wire portion 114 is directed into a wire end receptor 108, wire clip 100 effectively surrounds the end of second wire portion 114 eliminating the possibility of the terminus 118 of second wire portion 114 contacting anything outside of wire end receptor 108.

As illustrated, there is a tendency for first and second wire portions to diverge from parallel with each other. As a result, when both wire portions 112, 114 are secured within wire clip 100 as shown, the two wire portions tend to exert a force outwards from the center of wire clip 100 and away from one another. These forces work to secure wire clip 100 to both wire portions 112, 114 as does the force of gravity.

With reference to FIG. 4, there is illustrated an exemplary and non-limiting embodiment of wire clip 100. As illustrated, there is fabricated within wire clip 100 an insert 120 forming an embedded member. In some embodiments, insert 120 may be formed of metal, such as stainless steel. Fabricated as residing within the interior of wire clip 100, a terminus 122, 122' of insert 120 may extend into the interior space forming one of end receptors 108. While illustrated as forming a part of insert 120, terminus 122 is not so limited. Terminus 122 may be fabricated in any manner, including forming an integral part of wire clip 100, such that terminus 122 extends in some manner into the interior of end receptor 108 such that terminus 122 may be adapted to interact with end 118 of wire portion 114 so as to impede the retraction of end 118 from end receptor 108.

With reference to FIG. 5, there is illustrated an exemplary and non-limiting embodiment of wire clip 100 showing the interaction of terminus 122 and wire end 118. As illustrated, a portion of terminus 122 is in communication with a crimped portion of wire end 118. In some embodiments, wire end 118 may not be crimped and terminus 122 may be held in place by the force exerted upon it by terminus 122 pushing wire end 118 into a wall of wire end receptor 108. In other embodiments, the insertion of wire end 118 may compress terminus 122 inwards towards the center of wire clip 100 resulting in a force being generated tending to push terminus 122 in a manner so as to interact with wire end 118 and impede the removal of wire end 118 from wire clip 100.

Wire clip 100 may be fabricated via various methodologies including, but not limited to, injection molding, 3D printing, machining, and the like. As described, wire clip 100 is adapted to engage with any and all types of wire including, but not limited to, aviation wire.

With reference to FIGS. 6A-6C, there is illustrated another exemplary and non-limiting embodiment of a wire clip. With reference to FIGS. 6A and 6B, wire clip 600 comprises a generally cylindrical housing 602 open on a first end 604 and substantially closed on a second end 606. The closed second end 606 may be fashioned as a substantially dome shaped feature or may be any geometric shape sufficient to form a general enclosure. Likewise, the housing may assume any shape sufficient to form an interior space 608 of the wire clip 600.

A longitudinal through-channel 610 is cut into an outer surface of the wire clip at an angle $\Theta$ to the surface normal 612 of the housing 602. With reference to FIG. 6C, there is illustrated a top view of a wire clip 600 showing the longitudinal through-channel 610 extending into the second end 606 of the housing 602. As illustrated, when viewed from the top, the longitudinal through-channel appears as a V-shaped channel with an abrupt bend at an angle sufficient to permit the channel to terminate a point approximating a center point 614 of the second end 606.

As a result, when a wire is inserted into the longitudinal through-channel 610, through the V-shaped bend 616 and to the terminus of the channel, forces applied to the wire clip that are generally linearly directed in a direction approximating the surface normal will not result in a dislodgement of the wire. This results from there being to straight path between the terminus and the outside of the wire clip in the direction of the applied force.

In addition to the circuitous route that a wire must travel along the longitudinal through-channel to dislodge from the wire clip once the wire is positioned at the terminus, there may additionally be a protrusion 618 along the channel 610 and near the terminus that serves to maintain a wire in place at the terminus. In some embodiments, the wire clip is fabricated from a substance, such as plastic, that has some give. As a result, even is the width of the channel at the point of the protrusion is smaller than the diameter of the wire to be inserted, the housing of the wire clip may bend slightly to allow the wire to pass past the protrusion 618 and then snap back into position to secure the wire at the terminus.

With reference to FIG. 7, there is illustrated an exemplary and non-limiting embodiment of a wire clip functioning as described above. Wire 700 is shown securing a support member with the end portion 702 of the wire 700 wrapped around a first portion of the wire under tension. Wire clip 700 is passed through the longitudinal through-channel 610 and secure at the terminus 614. End portion 702 is wrapped around the first portion of wire 704 and is substantially enclosed within the interior space 608 of the wire clip 600.

We claim:

1. A wire clip comprising:
   a longitudinal hole; and
   a longitudinal through-channel having a generally U-shaped cross section wherein a first end of the longitudinal through-channel is in communication with a lateral opening and a second end of the longitudinal through-channel is closed;
   wherein the wire clip forms a generally rectangular prism.

2. The wire clip of claim 1 wherein the longitudinal hole comprises a first longitudinal hole that is blind.

3. The wire clip of claim 2, further comprising a second longitudinal hole.

4. The wire clip of claim 2 wherein the first longitudinal hole is outwardly divergent.

5. The wire clip of claim 1, wherein the lateral opening comprises outwardly divergent side walls.

6. A method of using the wire clip of claim 1, comprising:
   inserting a portion of a wire having a first end into the longitudinal through channel; and
   inserting the first end of the wire into the longitudinal hole.

7. The wire clip of claim 1, further comprising an embedded member having a first portion positioned within the wire clip and a second portion extending out and into the longitudinal hole.

8. A method of using the wire clip of claim 7, comprising:
   inserting a portion of a wire having a first end into the longitudinal through channel; and
      inserting the first end of the wire into the longitudinal hole;
   wherein the second portion of the embedded member acts in communication with the first end of the wire to secure the first end of the wire.

* * * * *